United States Patent [19]
Zavorotny et al.

[11] Patent Number: 6,137,433
[45] Date of Patent: Oct. 24, 2000

[54] SCATTEROMETER WITH ADAPTABLE SPATIAL RESOLUTION

[75] Inventors: Valery U. Zavorotny, Lafayette; Steven F. Clifford, Boulder, both of Colo.

[73] Assignee: The United States of America as represented by the Secretary of Commerce, Washington, D.C.

[21] Appl. No.: 09/271,327

[22] Filed: Mar. 18, 1999

[51] Int. Cl.[7] .............................. G01S 13/95; H04B 1/69; H04B 1/707
[52] U.S. Cl. .............................. 342/26; 342/59; 342/189; 342/192; 342/194; 342/195; 342/357.06; 342/357.12; 375/200; 375/208; 375/210
[58] Field of Search .............................. 342/26, 175, 189, 342/192–197, 357.01–357.17, 59; 375/200, 207, 208, 209, 210

[56] References Cited

U.S. PATENT DOCUMENTS

| | | |
|---|---|---|
| 4,106,017 | 8/1978 | Roeder et al. . |
| 4,172,255 | 10/1979 | Barrick et al. .............................. 342/26 |
| 4,463,357 | 7/1984 | MacDoran . |
| 4,748,448 | 5/1988 | Thompson . |
| 4,800,577 | 1/1989 | Tachita et al. . |
| 4,990,922 | 2/1991 | Young et al. . |
| 5,264,852 | 11/1993 | Marquet . |
| 5,347,284 | 9/1994 | Volpi et al. . |
| 5,414,729 | 5/1995 | Fenton .............................. 375/209 |
| 5,428,358 | 6/1995 | Gardner . |
| 5,534,868 | 7/1996 | Gjessing et al. . |
| 5,535,237 | 7/1996 | LaPadula, III et al. .............................. 375/200 |
| 5,546,087 | 8/1996 | Martin Neira . |
| 5,793,328 | 8/1998 | Ward et al. . |
| 5,907,578 | 5/1999 | Pon et al. .............................. 375/208 |

OTHER PUBLICATIONS

"Detection of Ocean Reflected GPS Signals: Theory and Experiment"; Garrison et al; Proceeding of the IEEE Southeaston '97, Engineering the New Century, Blacksburg, VA, Apr. 12–14 1997.

"Effect of sea roughness on bistatically scattered range . . ."; Garrison et al; Geophysical Research Letters, vol. 25, No. 13, pp. 2257–2260, Jul. 1, 1998.

"GPS Sounding of Ocean Surface Waves: Theoretical Assessment"; Clifford et al; 1998 IEEE International Geoscience and Remote Sensing Symposium Proceedings: vol. IV; Jul. 6–10, 1998.

"The Champ Mission and its Capabilities to Recover . . ."; Gruber; Ionospheric Determination and Specification for Ocean Altimetry and GPS Surface Reflections Workshop; Dec. 2–4, 1997.

"A Passive Reflectometry and Interferometry System (PARIS): Application to Ocean Altimetry"; Martin–Neira; ESA Journal 1993, vol. 17.

"Utilizing GPS to Determine Ionospheric Delay Over the Ocean"; Katzberg et al; NASA Technical Memorandium 4750; Dec. 1996.

Navstar GPS Operations; Navstar Global Positioning System; Jan. 22, 1999; on Internet at Tycho.USNO.Navy.Mil/GPSInfo.html.

*Primary Examiner*—Bernarr E. Gregory
*Attorney, Agent, or Firm*—Stevens, Davis, Miller & Mosher, L.L.P.

[57] ABSTRACT

A global positioning system (GPS) ocean scatterometer with an adaptable spatial resolution for sensing and processing GPS signals reflected from an ocean surface for wind measurements in a wide range of altitudes and wind velocities. To increase wind sensitivity at low altitudes, the GPS ocean scatterometer employs a sub-chip GPS receiver which includes, inter alia, a signal correlator and a pair of code correlators for generating a sub-chip footprint to boost system resolution. To increase wind sensitivity at high altitudes, the GPS ocean scatterometer employs a multi-chip GPS receiver which includes, inter alia, a wide-band oscillator and a multi-chip generator for generating a multi-chip footprint to boost scattered energy.

14 Claims, 17 Drawing Sheets

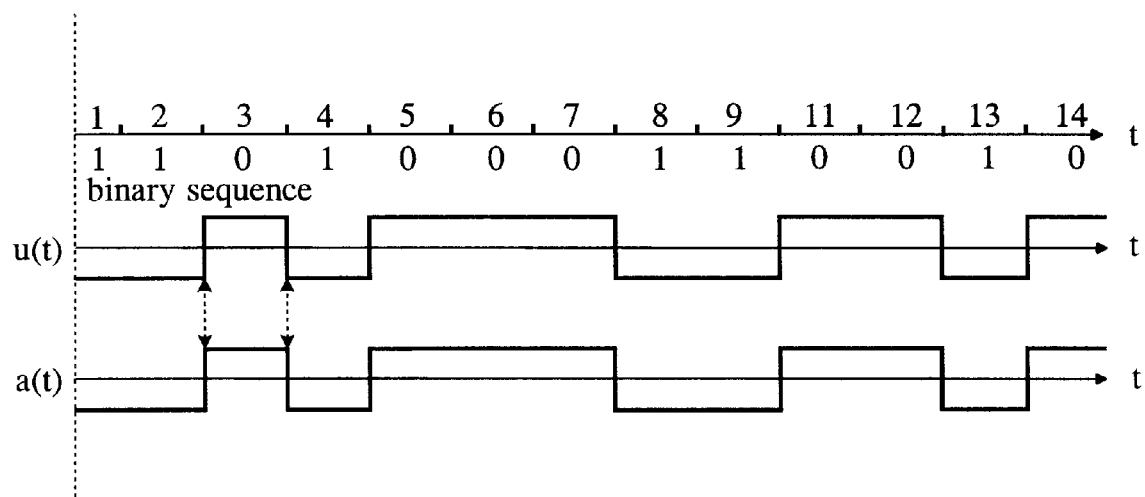
FIG.1-A
PRIOR ART

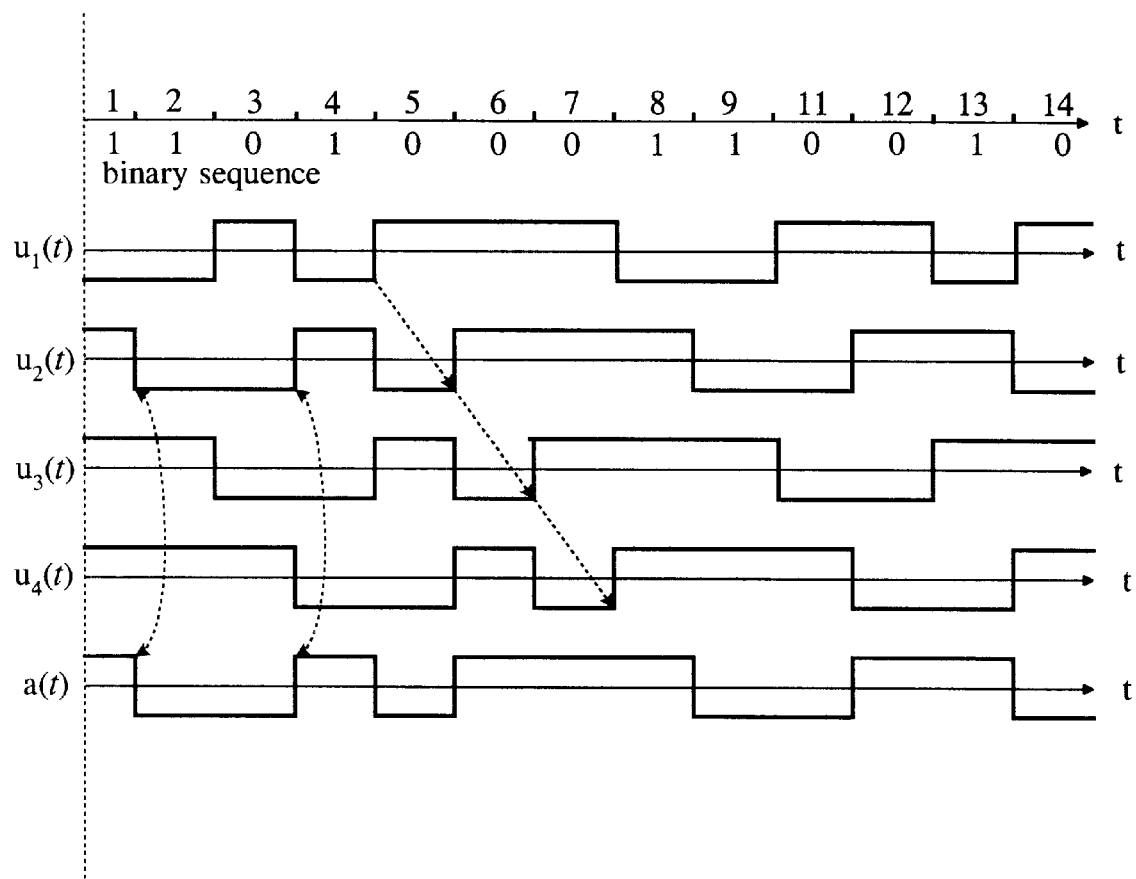
FIG. 1-B
PRIOR ART

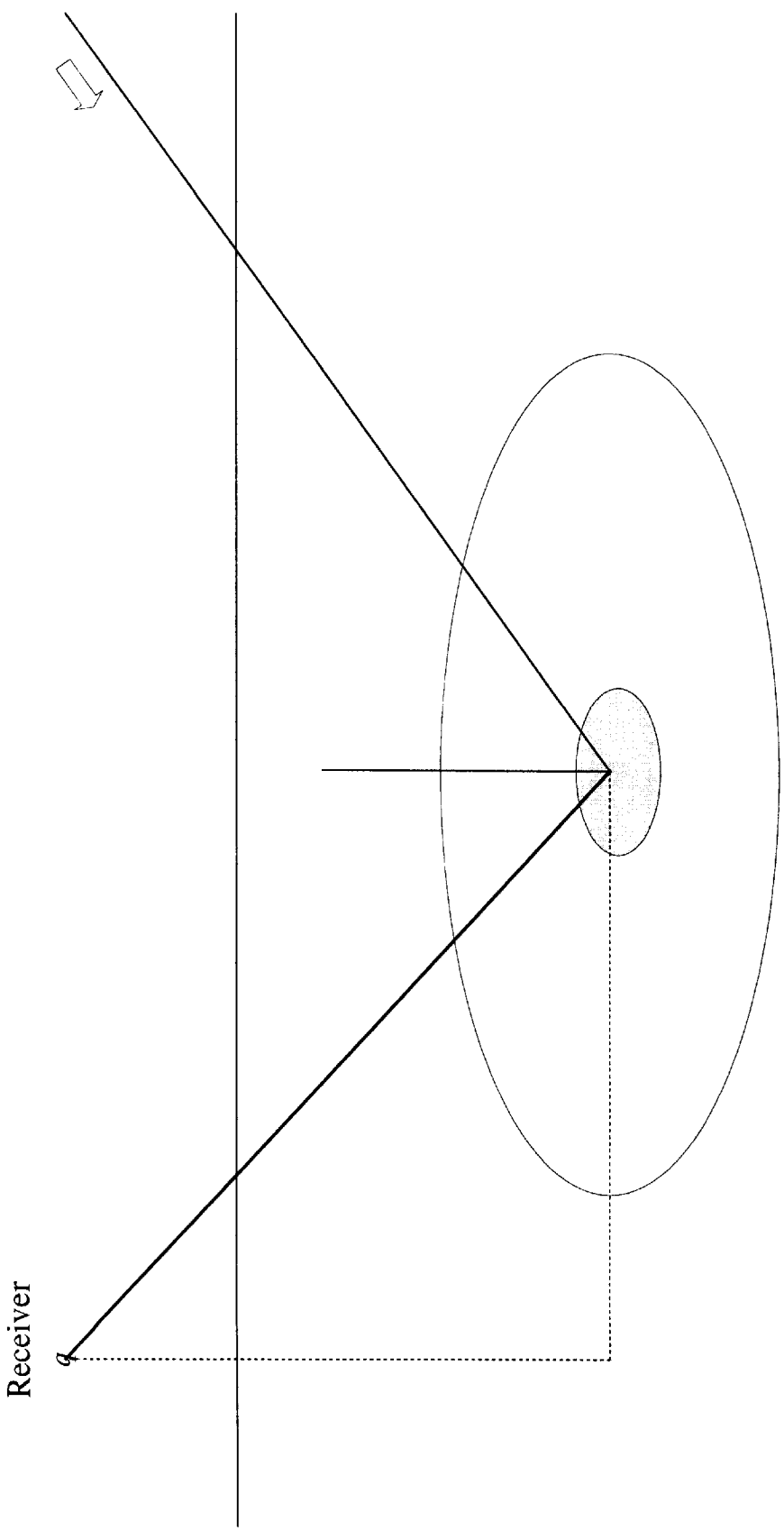
FIG. 5-A
PRIOR ART

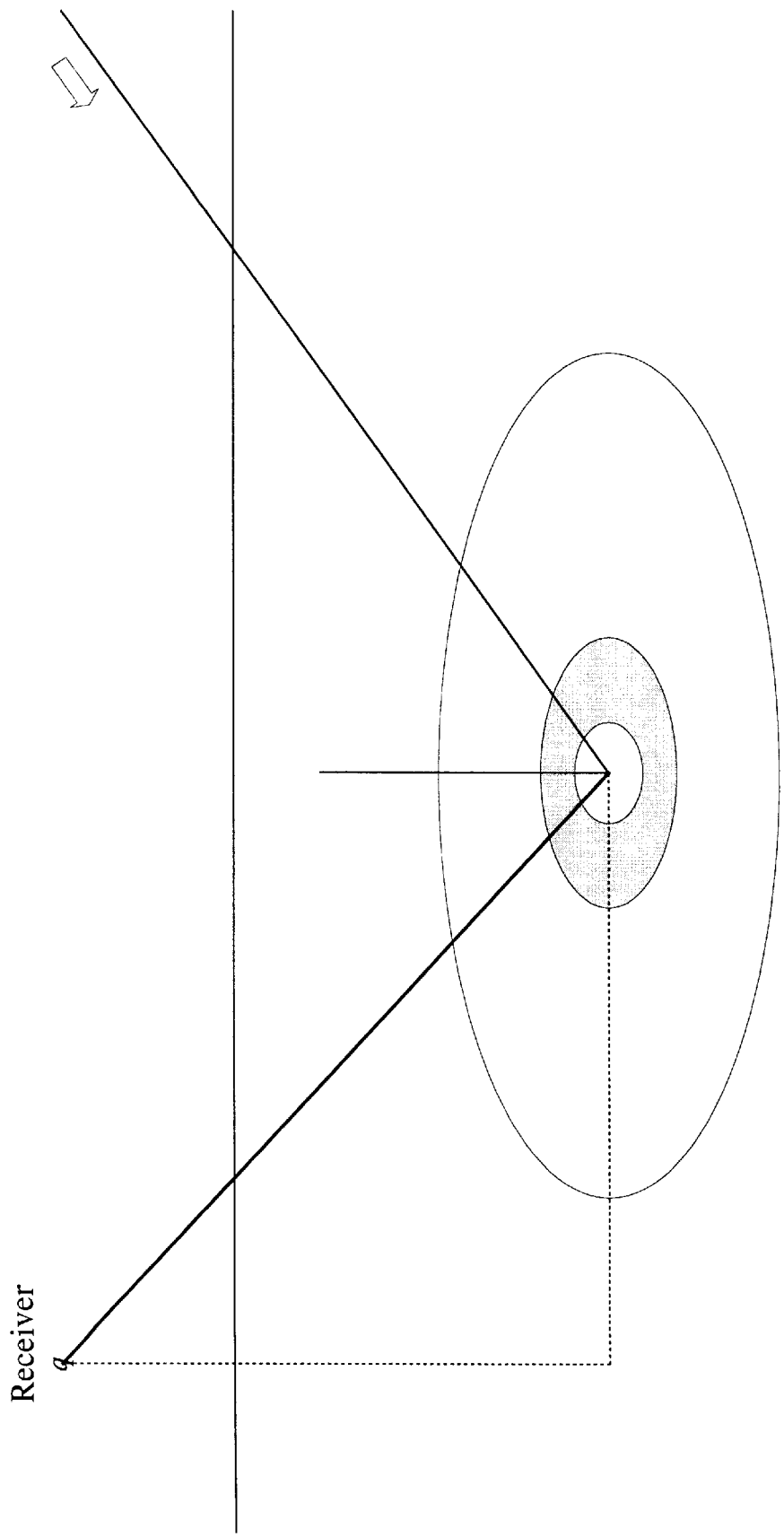
FIG. 5-B
PRIOR ART

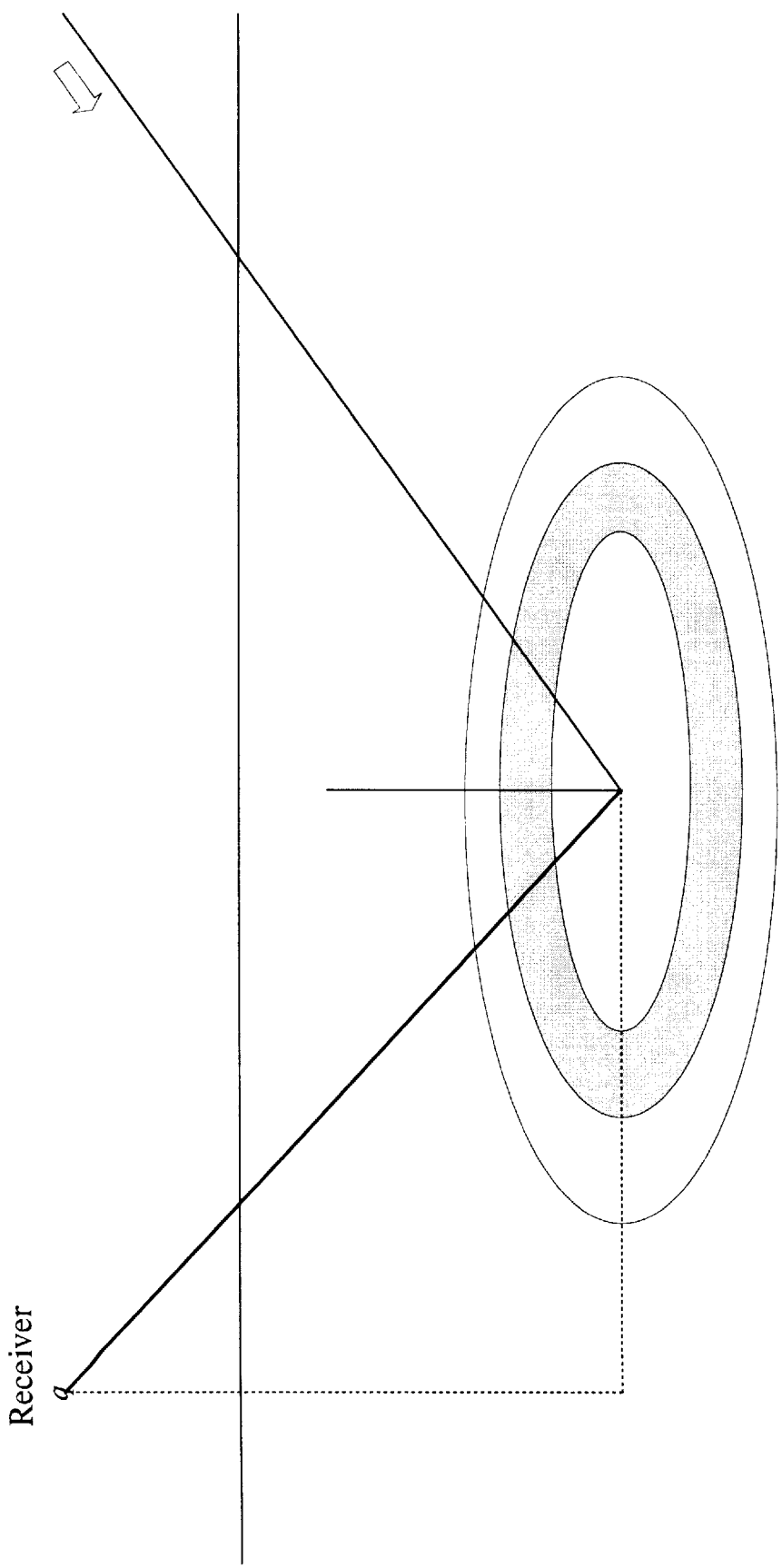
FIG. 5-C
PRIOR ART

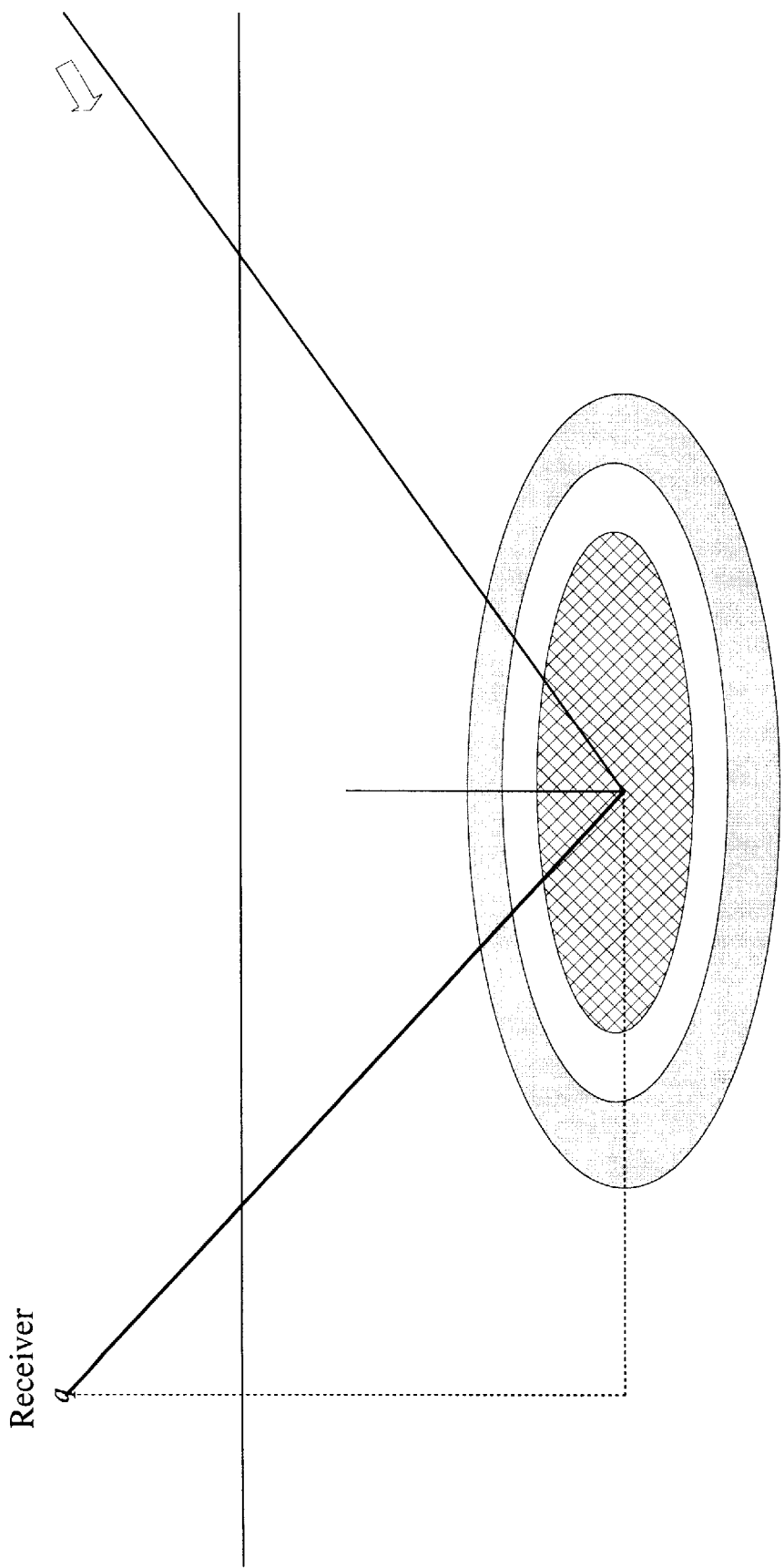
FIG. 5-D
PRIOR ART

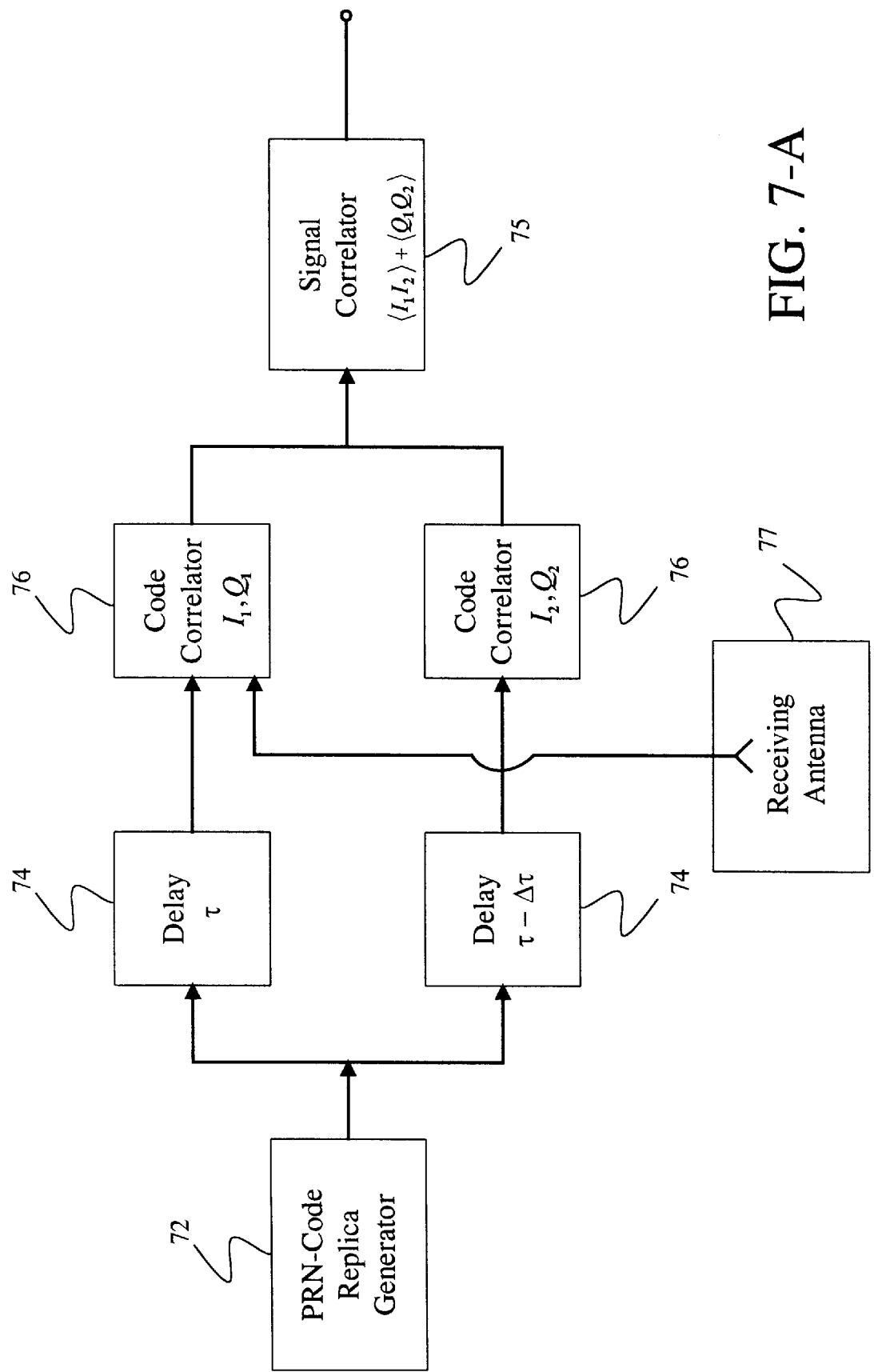
FIG. 7-A

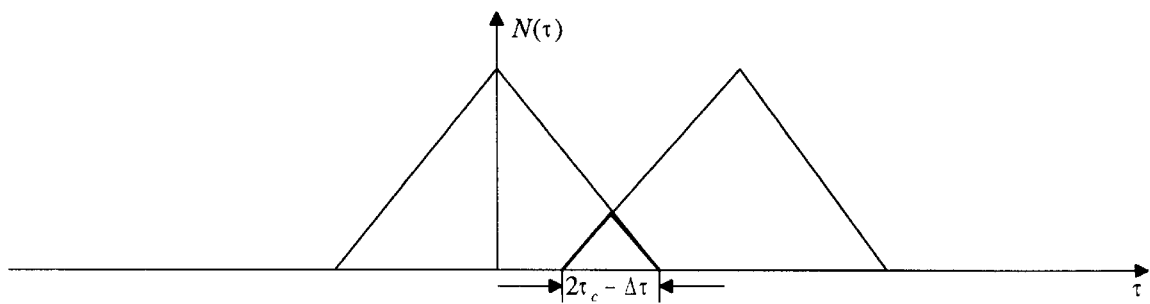
FIG. 7-B

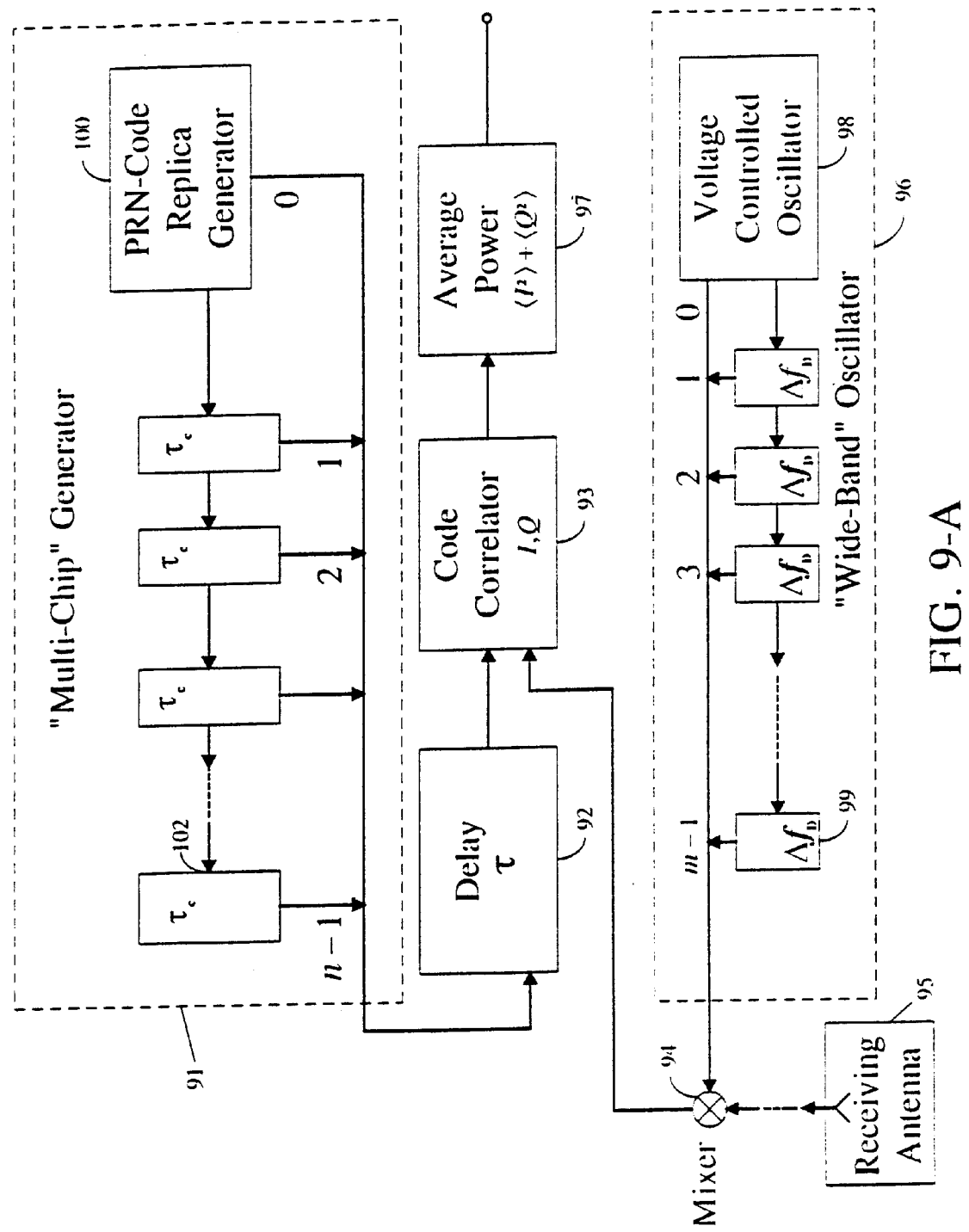
FIG. 9-A

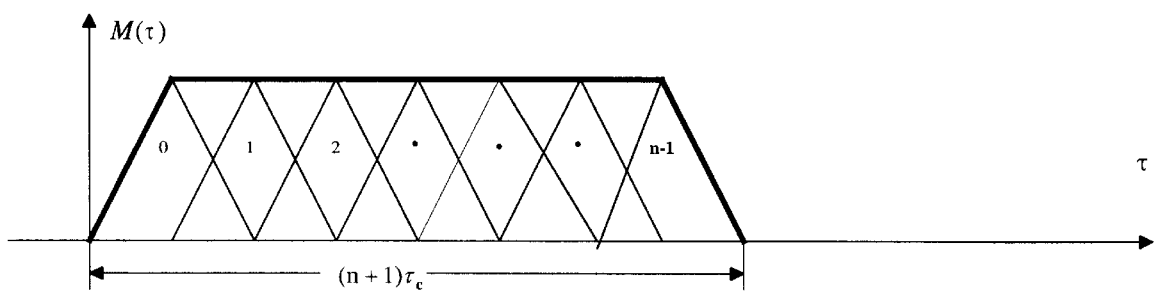
FIG. 9-B

SCATTEROMETER WITH ADAPTABLE SPATIAL RESOLUTION

BACKGROUND OF THE INVENTION

1. Field of the Invention

This invention generally relates to an airborne or a spaceborne ocean scatterometer for use in global wind measurements over an ocean surface. More specifically, the present invention relates to an apparatus and method for sensing and processing reflected global positioning system (GPS) signals from an ocean surface for wind measurements in a wide range of altitudes and conditions.

2. Description of Related Art

Monostatic scatterometers have been used to measure, with a high degree of accuracy, a surface backscatter cross section relating to the surface roughness at the scale of the observing wavelength. In particular, the backscatter measurements have been employed to acquire information about wind velocity over an ocean surface. For instance, as the wind blows over the ocean surface, it generates and amplifies surface waves due to the resonant coupling between the turbulent fluctuations in the air and the water surface. Since wind velocity is proportional to the roughness of the ocean surface, the wind velocity can be determined by tracking reflected signals from the ocean surface. Another type of a scatterometer is a bistatic scatterometer. It uses a transmitter and receiver separated by a significant distance and records the forward quasi-specular scatter from the transmitter in the direction of the receiver. This type of scatter provides information about surface slope statistics which is related to the surface wind vector. This information cannot be obtained by conventional backscatter (monostatic) scatterometer.

The following references provide background information relating to ocean scatterometers and are hereby incorporated by reference:

(1) S. F. Clifford, V. I. Tatarskii, A. G. Voronovich, and V. I. Zavorotny, *GPS Sounding of Ocean Surface Waves: Theoretical Assessment*, Int. Geosci. Remote Sensing Symp. Proc., Seattle, Wash. July 1998;

(2) S. J. Katzberg and J. L. Garrison, Jr., *Utilizing GPS to determine ionospheric delay over the ocean*, NASA Technical Memorandum, December 1996;

(3) J. L. Garrison, S. J. Katzberg and C. T. Howell, *Detection of ocean reflected GPS signals: theory and experiment*, IEEE Southeastcon '97 "Engineering the New Century, April 1997;

(4) M. Martin-Neira, *A passive reflectometry and interferometry system (PARIS): Application to ocean altimetry*, ESA Journal, Vol.17, No.4, pp. 331–355, 1993;

(5) U.S. Pat. No. 5,546,087;

(6) T. Gruber, *The CHAMP mission and its capabilities to recover the ocean surface from reflected GPS signals*, Ionospheric Determination and specification for Ocean Altimetry and GPS Surface Reflections Workshop, Jet Propulsion Laboratory, December 1997;

(7) K. D. Anderson, *A Global Positioning System (GPS) tide gauge*, AGARD SSP Specialists Meeting, Remote Sensing, Toulouse, France, Apr. 22–25, 1996, Paper No. 32, 1996;

(8) James L. Garrison and Stephen J. Katzberg, *Effect of sea roughness on bistatically scattered range coded signals from the Global Positioning System*, Geophysical Research Letters, Vo. 25, No. 13, pp. 2257–2260, Jul. 1, 1998.

(9) C. Elachi, *Spaceborne Radar Remote Sensing: Applications and Techniques*, IEEE Press, New York 1988;

(10) F. T. Ulaby, R. K. Moore, and A. K. Fung, *Microwave Remote Sensing: Active and Passive*, vol. 2, Addison-Wesley Reading, Mass. 1982;

(11) B. W. Parkinson, J. J. Spilker, P. Axelrad, and P. Enge (Eds.), *Global Positioning System: Theory and Applications*, American Institute of Aeronautics and Astronautics, vol. 1, pp. 793, 1996;

(12) S. M. Rytov, Yu. A. Kravtsov, and V. I. Tatarskii, *Principles of Statistical Radiophysics*, Springer-Verlag, Berlin, Vol. 4, 1988;

(13) J. R. Apel, *An improved model of the ocean surface wave vector spectrum and its effects on radar backscatter*, J. Geophys. Res., vol. 99, pp. 269–291, 1994; and Additionally, the following symbols and definitions are typically used to illustrate conventional GPS bistatic scatterometers:

a pseudo-random noise code in code-chip length ($\tau_c$);

b replica of pseudo-random noise code in code-chip length ($\tau_c$);

c speed of light;

f frequency;

h GPS receiver altitude;

j,m,n variables representing certain fixed numbers;

q scattering vector value;

s slope variance;

t moment;

x,y,z spherical coordinates;

D Doppler shift;

F footprint;

I inphase component;

Q quadrature component;

$R, R_0$ range from GPS transmitter/receiver to scattering surface;

T time;

Y received signal correlation;

$\theta$ grazing angle;

$\Lambda$ triangle function;

$\sigma$ differential backscattering coefficient;

$\tau$ time delay (interval or time duration of one C/A chip); and $\rho$ integration point (variable) on surface.

Atmospheric profiles may be obtained at a modest cost if GPS direct signals are efficiently utilized by space-borne receivers. For instance, the existing net of 24 Navigation Satellite Timing And Ranging (NAVSTAR) satellites have been tested for use in ocean altimetry, wind scatterometry, and ionospheric sounding by receiving GPS signals scattered from the Earth's land and ocean surface (see references 1–8). GPS satellite transmitters emit a phase-code modulated signal with a highly stable carrier 24 hours a day practically above any point on the planet. Various conventional GPS bistatic scatterometers which deploy GPS receivers on, e.g., airplanes, low-orbiting satellites or an elevated ocean coast have been disclosed, for instance, in references 2–8. The conventional radar remote sensing techniques used in the conventional bistatic radar-scatterometer for extracting information about surface characteristics with elements of a synthetic aperture radar (see, e.g., references 9 and 10) have been employed in the conventional GPS bistatic scatterometers. The peculiarity of the conventional GPS bistatic scatterometer is that its forward-scatter character provides information regarding an ocean surface which is complimentary to that obtained from other conventional backscatter scatterometers.

References 3 and 8 disclose, through pioneering experiments, that the scattering of GPS signals from the ocean surface can be detected by a specially designed Plessey GPS receiver. Reference 6 discloses plans to launch satellites with GPS receivers on-board to track GPS signals reflected off the ocean surface to investigate the possibility of ocean altimetry and scatterometry. Based on mathematical calculations, however, reference 1 shows that the Plessey-type receiver with a low-gain, wide-beam antenna must operate at altitudes of 5 to 15 kilometers (km) to yield decent results. For instance, for an orbit platform of 300 km, calculations (even with the assumption of a full Doppler-shift compensation) give the reflected signal level (normalized to the direct signal) less than −20 decibels (dB). Additionally, for the Plessey-type receiver at lower than 5 km altitudes, the receiver cannot provide enough sensitivity to the wind speed because of the too coarse spatial resolution of this system (see reference 1).

A conventional GPS scatterometer having an one-chip limited footprint is discussed hereinbelow. Referring to a conventional GPS transmitter, the wide-beam antenna of the GPS satellite emits right-hand circularly polarized electromagnetic waves. The temporal structure of the GPS direct signal is quite complicated (see reference 11). It consists of two highly stable almost monochromatic carriers, L1 and L2, upon which three modulations are impressed: the C/A code, the P-code, and the broadcast message. All components of the GPS signal are based upon the fundamental clock rate $f_0$ of 10.23 MHz. The GPS carriers L1 and L2 are $f_{c,2}=154f_0$ for L1 and $f_{c,2}=120f_0$ for L2.

The method of modulating the carrier is a binary biphase modulation. The two codes are pseudo-random noise (PRN) codes. The P-code is at the modulation frequency $f_{m,P}=f_0$, and the C/A code is at $f_{m,C/A}=f_0/10$. According to these frequencies a binary biphase modulation function a(t) acquires values either 1 (normal state) or −1 (mirror image state). These states of the modulation function are called "chips" rather than bits to indicate that they do not carry data. One chip lasts for a time period of $\tau_c=1/f_m$, and has length $\Delta=c\tau_c$. The carrier is modulated by multiplying it by a(t). Each transition of a(t) from +1 to −1 or from −1 to +1 leads to a 180° phase shift of the carrier. This modulation spreads the signal over a wide bandwidth, and it is usually referred as a spread-spectrum technique. The advantages of using this technique are found in, e.g., reference 11.

The signal $u(t_0)$ obtained from the antenna output at a moment $t_0$ after the Doppler shift compensation is convolved with a replica of PRN code-modulation function a(t) taken at a different time moment $t_0+\tau$:

$$Y(t_0, \tau) = \int_0^{T_1} a(t - t_0 - \tau)u(t - t_0)dt \quad (1)$$

In the case of a direct signal, u(t) is simply proportional to a(t) taken with some time offset $t_{off}$ caused by the propagation from the transmitter to the receiver. Because the GPS receivers described in references 2–8 are based on C/A code allowed for a civilian use, the function a is equal to +1 or −1 within the time interval $\tau_c$ or "chip," equal to about 1 μs. In the spatial domain the chip length is about 300 m. The procedure in equation (1) is used to dispread the signal and to find the time offset $t_{off}$ for navigational purposes. This procedure is called code correlation because the correct time offset $t_{off}$ is achieved by cross-correlating the received signal with the code replica a (see FIG. 1-A). A time elapse is required to search for the maximum correlation by repeating this procedure many times for different time delays. The maximum correlation indicates that the two codes are aligned. Once the maximum is found, then the signal integrating starts. Finally, the signal level depends on the integration time $T_1$.

Referring to the conventional method of generating the one-chip-limited footprint, the GPS bistatic scatterometer uses the GPS transmitter of opportunity and the GPS receiver of the scattered signal (see, e.g., the GPS airborne receiver described in references 3 and 8). Schematically, the hardware consists of two receivers configured so that one received the GPS signal in the conventional manner using a right-hand circularly polarized (RHCP) antenna on top of the airplane fuselage. This up-looking channel collects all needed navigational information and controls the other down-looking channel, which receives the scattered signal using an antenna on the bottom of the fuselage which is LHCP because of polarization change in the scattered signal. The main purpose of this receiver is to record the signal level. The uplooking receiver is programmed to track the six highest zenith angle satellites visible, and the downlooking receiver provides six "daughter" channels which look for reflected signals from the same six satellites that their uplooking "mothers" are tracking. Because the GPS satellite, the GPS receiver, and scattering surface itself are moving with respect to each other, the carrier frequency of scattered signal acquires an additional Doppler shift which tends to be different for different parts of the scatter surface. The conventional GPS receiver provides the possibility to annul the Doppler shift, but only for one specific value δf in a time.

The signal obtained from the down-looking antenna output $u(t_0)$ at a moment $t_0$ is convolved with a replica of PRN code-modulation function a(t) taken at a different time moment $t_0+\tau$ using the same procedure as in equation (1). However, there are some important differences. In the case of a signal scattered from a surface (see FIG. 2), u(t) is proportional to the surface integral from $a(t, \vec{r})$ rather than to the a(t) itself:

$$u(t)=\int a[t-(R_0+R)/c]g(\vec{r},t)\exp[2\pi i(f_c-f_D(\vec{r}))t]d^2r \quad (2)$$

In this instance, the stochastic function $g(\vec{r},t)$ describes the instantaneous effect of the surface scattering (see, e.g., reference 12). The term in the exponent describes the frequency misalignment between the compensation frequency offset $f_c$ and the Doppler shift $f_D$, where $f_D=(\vec{v}_0 \cdot \vec{R}_0/R-\vec{v}\cdot\vec{R}/R)/\lambda$.) shift is caused by the receiver and transmitter motions with respect to the Earth's surface. The vector $\vec{R}_0$ is the distance vector pointing from the transmitter to the integration point p on the surface and $\vec{R}$ is the distance vector pointing from that surface point to the receiver; $\vec{v}_0$ and $\vec{v}$ are the velocity vectors of the transmitter and the receiver, respectively. In this instance, the Earth's rotation speed and the possible hydrodynamic speed of the water surface are neglected. The mean surface position is at z=0 with z-axis directed upward, and a transmitter and receiver located in the (x,z)-plane (see FIG. 2). The integration in the right-hand part is performed over the mean-level surface of the ocean.

It follows from equation 2 that the signal $u(t_0)$ at a given time moment $t_0$ is composed of the $a(t)$ functions taken at different moments $t=t_0-(R_0+R)/c$. Because of a variety of distances $R_0+R$, points on the surface can be found for which the procedure in equation (1) gives a maximal signal Y. These points corresponds to the situation when $a(t_0-t-\tau)$ from equation (1) exactly matches $a[t_0-(R_{0+}R)/c]$ from equation (2). This situation is depicted in FIG. 1-B where signals $u_1, u_2$, etc., denote partial contributions from surface zones with various distances $R_0+R$ that simultaneously reach the antenna at some moment t. In FIG. 1-B the situation is shown where the replica a aligns (correlates) only with the contribution $u_2$. Therefore, the mean surface itself creates a correlation processor transforming range delays into temporal delays. The important feature of this processor is that zero time is needed to find the maximal correlation because the alignment of the code a from the signal and its replica always happens for the appropriate spatial zone on the surface. The position of this zone is easily predicted from the navigation information obtained from the direct GPS channel.

The final output of the GPS receiver is the power averaged over time $T_2 \gg \tau_c$ as a function of a time delay $\tau$ which is proportional to the value of $<|Y(\tau)|^2> = <I^2(\tau)> + <Q^2(\tau)>$, where I and Q are inphase and quadrature components of the signal Y. The block diagram of the one-chip GPS receiver of a scattered signal is depicted in FIG. 3.

In particular, FIG. 3 shows a PRN code replica generator 32 for generating a replica of the pseudo-random noise (PRN) codes, which is passed through a discrete delay device 34 with an output to one of the two inputs in a code correlator 35. The other input of the code correlator receives reflected GPS signals thorough a receiving antenna 36. The code correlator 35 correlates the delayed replica of the PRN codes with the reflected signal. The output of the code correlator 36 is processed by an average power integrator to generate an averaging power signal over time $T_2 \gg \tau_c$. The average power signal is further processed by a signal processor (not shown) to derive data on wind conditions such as wind velocity vectors.

By making use of the Kirchoff approximation and assuming that $T_2$ is much smaller than the typical correlation time caused by the surface statistics (i.e., a "frozen"-surface assumption), the average power can be expressed as:

$$\langle |Y(\tau)|^2 \rangle = \frac{1}{T_2} \int_0^{T_2} |Y(\tau, t_0)|^2 dt_0 = \int \frac{|F(\vec{r}, \tau)|^2}{4\pi R_0^2 R^2} \sigma_0(\vec{\rho}) d^2\rho \quad (3)$$

The integration in the right-hand part is performed over the mean-level surface of the ocean. Equation (3) has a form of a bistatic-radar equation with the function $F^2$ as a radar footprint, and with the function $\sigma_0$ as the scattering cross-section of the sea-surface. This function originates from auto-correlation of the stochastic function $g(\vec{r}, t)$ in equation (2). In the case of diffusive scattering (i.e., the Rayleigh parameter is large, $q_z \sigma_\zeta \gg 1$), the geometrical optics limit can be represented as:

$$\sigma_0 = \pi |V|^2 (q/q_z)^4 W(-q_\perp/q_z) \quad (4)$$

where V is the polarization-dependent Fresnel reflection coefficient; $\vec{q} = K(\vec{R}/R - \vec{R}_0/R_0)$ the scattering vector, and W is the probability density function of surface slopes. For example, for isotropic Gaussian slopes it is described by $$W(\vec{s}) = (1/\pi <s^2>) \exp(-s^2/<s^2>) \quad (5)$$

with the total slope variance $\sigma_s^2 \equiv <s^2> = <s_x^2> + <s_y^2>$.

The footprint function F appears in equation (3) in a result of the code-convolution process in equation 1:

$$F(\vec{r}, \tau) = \int_0^{T_1} a[t-\tau]a[t-(R_0+R)/c]\exp[2\pi i(f_c - f_D(\vec{r}))t]dt \quad (6)$$

This function can be approximated by the product of two functions $$F(\vec{r}, \tau) \approx T_1 \Lambda[\tau-(R_0+R)/c]D(\vec{r}) \quad (7)$$

where $$\Lambda(\tau) = \frac{1}{T_1} \int_0^{T_1} a(t-\tau)a(t)dt \quad (8)$$

The function $\Lambda$ has the shape of a triangle with the base $2\tau_c$ (see FIG. 4). It is equal to zero for $|\tau| > \tau_c$ and $$\Lambda(\tau) = \begin{cases} [1-|\tau|/\tau_C] & \text{for } |\tau| \le \tau_C \\ 0 & \text{for } |\tau| > \tau_C \end{cases} \quad (9)$$

It includes into integration in equation (3) only the part of a surface which satisfies the condition $|\tau-[(R_0+R)/c]| < \tau_c$, (i.e., one-chip-footprint). This area has a shape of an elliptic ring (an annulus zone) which expands with $\tau$. Elliptic boundaries of the annulus zone are, so-called, iso- or equi-range lines satisfying the condition $R+R_0=$const. It means that all GPS signals scattered from points located on an ellipsoid of a rotation (having the transmitter and the receiver in its foci) experience the same delay time. The intersection of this ellipsoid with the surface is approximately an ellipse. In practice $\tau$ is large enough to compensate a bulk delay caused by a signal propagation from a transmitter to a receiver.

Referring to the Doppler shift and corresponding Doppler zones as shown in FIG. 2, points located on coaxial cones, with the line connecting the receiver and the transmitter as the axis and the receiver a the apex, have returned echoes with identical Doppler shifts. The intersection of these cones with the surface plane gives a family of hyperbolas. Scatterers on a certain hyperbola will provide equi-Doppler returns. The function $$|D(\vec{r})| = \left| \frac{1}{T_1} \int_0^{T_1} \exp[2\pi i(f_c - f_D(\vec{r}))t]dt \right| \quad (10)$$

$$= \frac{\sin[\pi(f_c - f_D(\vec{r}))T_1]}{[\pi(f_c - f_D(\vec{r}))T_1]}$$

describes the zone on the surface limited by to such hyperbolas for which the Doppler-shift differs by about $\delta f = 1/2T_1$.

Assuming that the Doppler shift is annulled for the entire area of the integration in equation (3), the annulus zone would turn to the footprint zone. This occurs for relatively slow moving and low flying platforms as airplanes. For satellite altitudes and speeds, the width of the Doppler zone can be smaller than both the glistening zone and annulus zone. Generally, the footprint is described by the function F in equation (7) or (8), and is the area of the intersection of the Doppler zone and the annulus zone (see areas A and B in FIG. 2). The level of the received signal is roughly proportional to the ratio between the footprint area and the glistening zone area. With increasing the glistening zone and decreasing the footprint the received signal is dropping.

Therefore, for the given transmitted power, the area of the footprint is insufficient to produce required level of the scattered signal at the receiver antenna location. One way is to increase the receiving antenna gain. However, this will create the loss of many advantages of the low-gain antenna: the small size, the low weight and cost, the capability to operate with a multiplicity of satellites.

Referring to the limitations on wind retrieval with the one-chip-limited GPS receiver, the performance of the one-chip-limited GPS receiver of scattered signal can be considered under the aspect of wind retrieval if the Doppler shift is assumed to be completely removed for the entire range of the annulus zone. The width $\rho_g$ of $\sigma_0$ over p determines the glistening zone on the ocean surface. The value of $\rho_g$ is proportional to the receiver altitude h and the R.M.S. slopes $\sigma_s$. In absence of winds the glistening zone shrinks to the single specular point. At the same time the width of the chip-limited footprint or the annulus zone, $\rho_a$ is proportional to the square root of $hc\tau_c$. For low receiver altitudes and for low winds, $\rho_g$ can be smaller than $\rho_a$. Also the Doppler shift can be easily compensated for the entire glistening zone. In this situation the integral in equation (2) can be evaluated by replacing the footprint function F with the annulus function $\Lambda$ the W-function with the $\delta$-function. Therefore, any dependence on $\sigma_s^2$, or wind speed disappears, and it can be concluded that these altitudes are not optimal for wind retrieval. However, there exists a range of altitudes and wind speeds were the relationship between $\rho_g$ and $\rho_a$ is optimal, i.e. $\rho_g = \rho_a N$, where the number N is close to the number of bins in time-delay sampling over $\tau$. It means that for different moments of time delay $\tau$ (taking a proper time offset) from 0 to some $\tau_{max}$ the annulus zone will scan through the entire glistening zone, and the dependence of the received signal on e will reflects the shape of this zone. Such optimal process is depicted schematically in FIGS. 5-A through 5-D. With further increase of the receiver height, the width of the glistening zone can become so large such that: (a) for the fixed $\tau_{max}$, the center of the glistening zone stays constant, and never reach its periphery, and (b) for fixed $\tau_c$, the portion of scattered energy intercepted by the annulus zone will decrease with the glistening zone expanded further.

The results of the numerical computations are shown in FIGS. 6-A through 6-C. Curves correspond to the value of the left-hand polarized scattered signal (as a function of $\tau$) normalized on the direct signal, $P_N(\tau) = <|Y(\tau)|^2> R_d^2/\Lambda^2(0)$, where $R_d$ is the distance between the GPS satellite and the receiver. The value of the time offset was chosen to have a maximal signal at $\tau=0$ for the case of a perfectly specular reflection from the surface. In the calculations the Gaussian statistics of slopes with non-isotropic surface slope variances $<s^2_x>$, $<s^2_y>$ are used. These variances are wind-dependent and are derived from a Donelan-Banner spectrum for developed seas (see, i.e., reference 13) by integration over wave numbers smaller than $2\pi$, where $\lambda=0.2$ m for L1 GPS carrier. Typical values of R.M.S. slope angles $a_{x,y} = \mathrm{atan} <s^2_{x,y}>^{1/2}$ for different values of wind speed at 10 m height are: for $U_{10}=4$ m/s: $a_x=4.7°$ and $a_y=3.3°$; for $U_{10}=10$ m/s: $a_x=6.6°$ and $a_y=5.5°$; for $U_{10}=20$ m/s: $a_x=7.8°$ and $a_y=7.0°$.

The curves are calculated for the case of the 90° GPS elevation angle and the 0° wind direction. Trailing edge slopes in FIGS. 6-A and 6-C demonstrate lower sensitivity to wind speed than in FIG. 6-B. One can see that for low and high altitudes the situation for the wind retrieval is unfavorable.

The theoretical assessment (see reference 1) of the performance of the GPS bistatic scatterometer with low-gain, wide-beam antenna described in, e.g., references 2, 3 and 8 shows that the signal scattered from the ocean surface and received by such system is sensitive to the typical surface wind speed only for some limited interval of altitudes h of the receiving antenna, around 10 km. The performance of the mentioned GPS scatterometer is not optimal for lower and higher altitudes. Particularly for satellite altitudes, the level of signal is typically less than −20 dB. If limitations caused by the Doppler shift are taken into account, then this number would be reduced even more. To suppress those negative factors suggestions were made (see reference 4) to use high-gain, narrow-beam antennas. However, this would eliminate many of advantages of GPS receivers with low-gain antennas: the low cost, size and weight; the simultaneous access to several GPS satellites; the operational robustness.

SUMMARY OF THE INVENTION

In view of the foregoing disadvantages with the prior art systems, it is the object of the present invention to provide a system and method based on a low-gain wide-beam antenna with an adaptable spatial resolution to allow for a stronger signal and optimal performance of the GPS scatterometer to allow wind measurements in a wide range of altitudes and wind velocities. By modifying the signal processing in the GPS receiver, the Doppler shift is completely or partially compensated and a new footprint with smaller size or larger than that defined by the nominal system resolution is created. For lower altitudes, a smaller footprint provides better resolution which increases sensitivity to wind velocities. For higher altitudes, a larger footprint collects more scattered energy and increases sensitivity to the wind velocities.

Another object of this invention is to provide a system and method of employing code-correlation algorithms which synthesize annulus zones that are narrower or wider than those disclosed in the prior art one-chip-limited-footprint to overcome difficulties with too low or too high altitudes.

These and other objects, features and advantages will be made apparent by the following description of preferred embodiments of the invention when read in connection with the accompanying drawings.

BRIEF DESCRIPTION OF THE DRAWINGS

FIGS. 1-A through 1-B are timing diagrams showing cross-correlation procedures of direct GPS and scattered GPS signals, respectively;

FIGS. 5-A through 5-D are geometrical diagrams showing footprints at different time delays with Doppler shifts removed;

FIG. 7-A is a block diagram of a sub-chip GPS receiver in accordance with a first embodiment of the present invention;

FIG. 7-B is a graph showing the footprint functions generated by the sub-chip GPS receiver of the present invention;

FIG. 9-A is a block diagram of a multi-chip GPS receiver in accordance with a second embodiment of the present invention;

FIG. 9-B is a graph showing the footprint functions generated by the multi-chip GPS receiver of the present invention;

DESCRIPTION OF THE PREFERRED EMBODIMENTS

Figure 2:
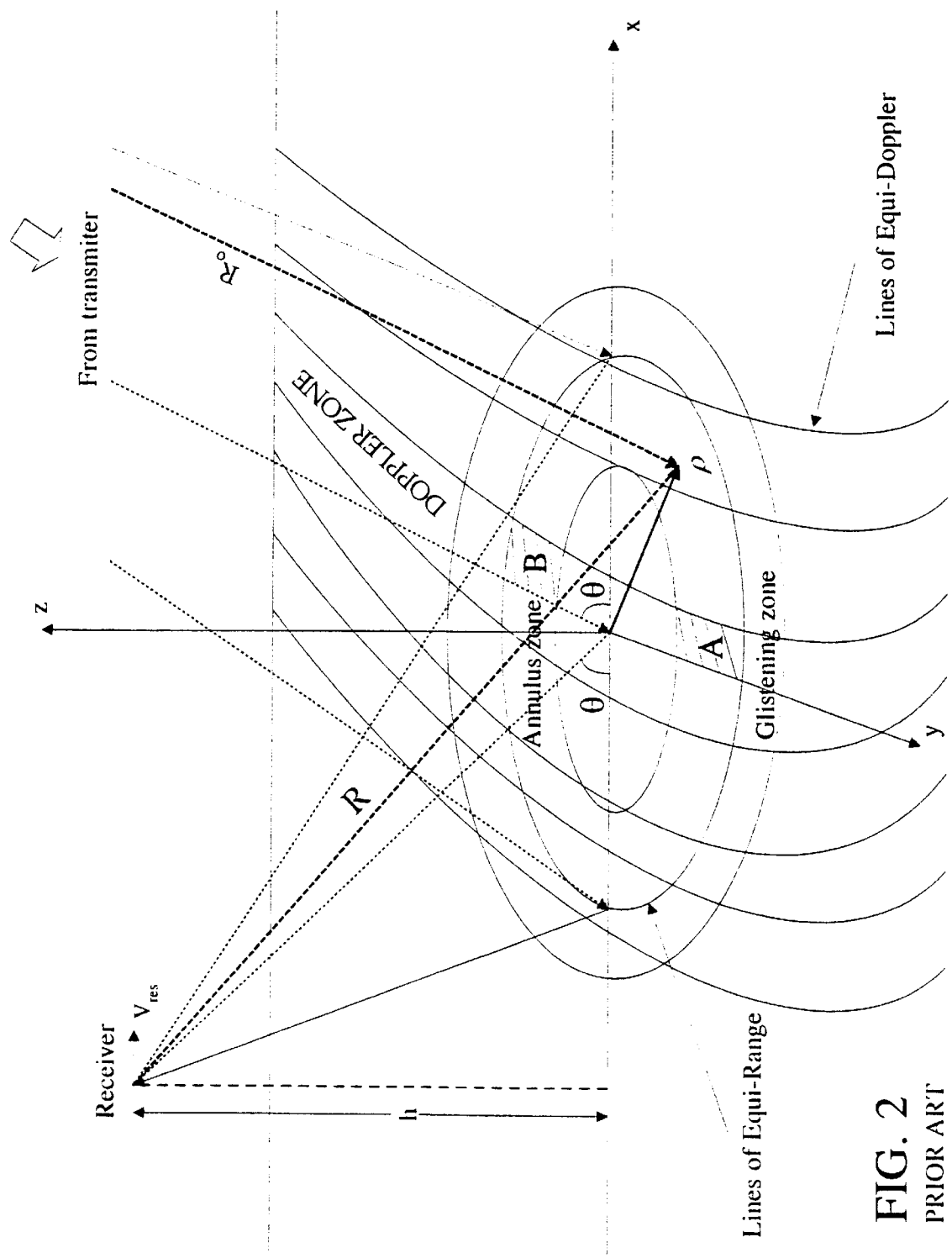
FIG. 2 is a geometrical diagram of a conventional bistatic GPS scatterometer.

Referring to a method of generating a sub-chip limited footprint according to the present invention, instead of producing the average power of the signal Y, a correlation between signals Y taken at the same moment of the absolute time $t_0$, but for different time delays $\tau$ is produced as:

$$\langle Y(t_0, \tau)Y^*(t_0, \tau - \Delta\tau)\rangle = \frac{1}{T_2}\int_0^{T_2} Y(t_0, -t, \tau)Y^*(t_0 - t, \tau - \Delta\tau)dt \quad (11)$$

In terms of inphase and quadrature components, they can be expressed as:

$$\langle Y_1 Y_2^* \rangle = \langle I_1 I_2 \rangle + \langle Q_1 Q_2 \rangle \quad (12)$$

A block-diagram of the above-mentioned sub-chip GPS receiver according to the present invention is depicted in FIG. 7-A. More specifically, FIG. 7-A shows a PRN code replica generator 72 for generating a replica of the pseudo-random noise (PRN) codes, which is passed through a pair of discrete delay circuits 74 with each incorporating a different time delay to a pair of code correlators 76. One of the code correlators 76 has two inputs for receiving both the first delayed PRN codes and reflected signals detected through a receiving antenna 77. The other code correlator has a single input for receiving the second delayed PRN codes. The outputs of the code correlators are integrated/correlated by a signal correlator 75 which averages and accumulates the two correlated signals over a preset time $T_2$. The averaged and accumulated power signal is further processed by a signal processor (not shown) to derive data on wind conditions such as wind velocity vectors.

Figure 3:
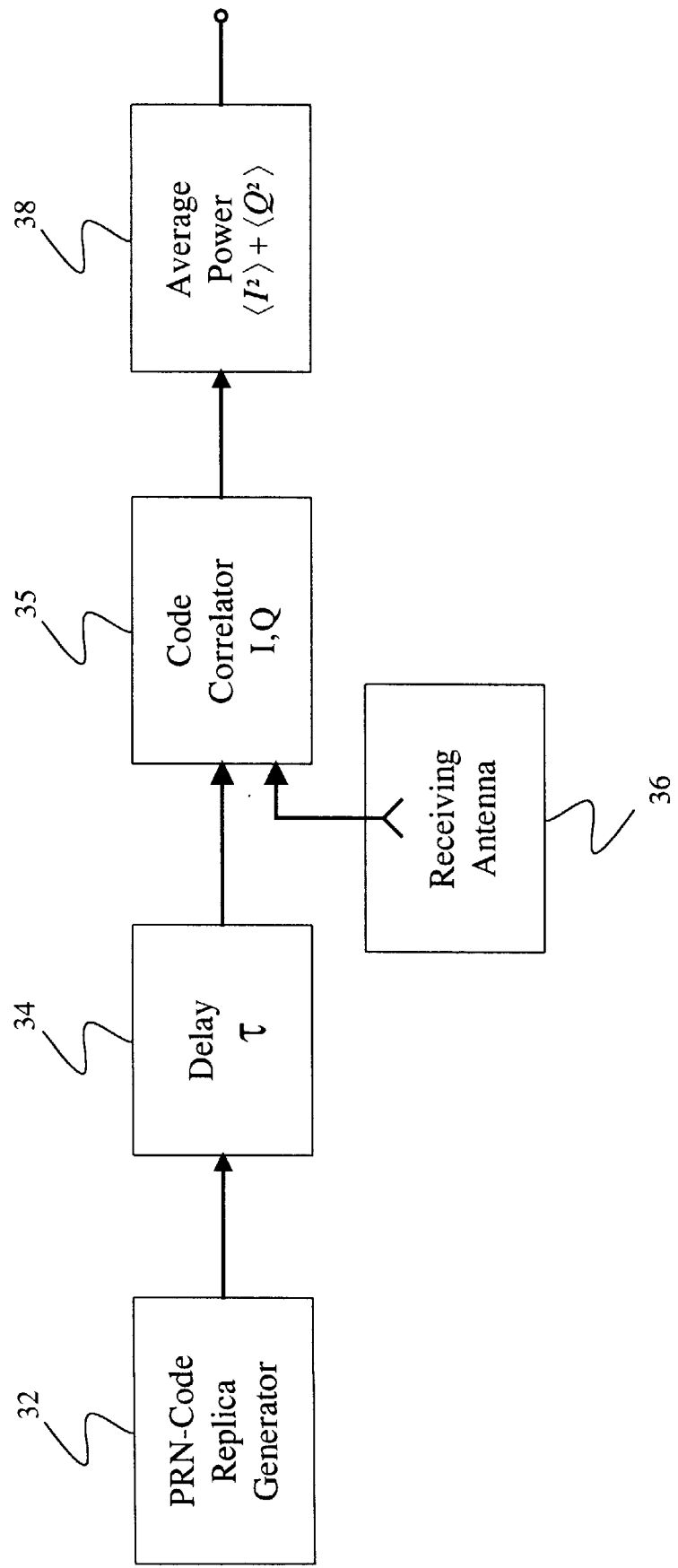
FIG. 3 is a block diagram of a conventional one-chip GPS receiver.
Figure 4:
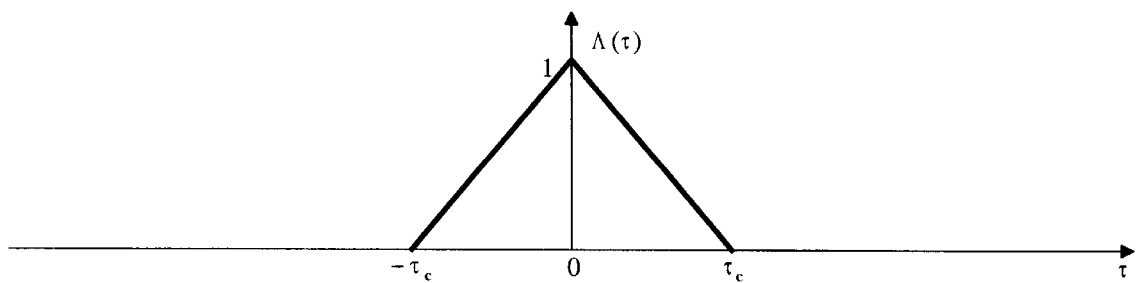
FIG. 4 is an illustration showing footprint functions generated by the conventional one-chip GPS receiver.

In contrast to the one-chip GPS receiver shown in FIG. 3, the sub-chip GPS receiver of the present invention has two delay circuits 72 and two code-correlators to convolve the signal with the replica of the PRN codes from the PRN-code replica generator 72. The sub-chip GPS also employs a signal correlator 75 to process (i.e., integrate and correlate) the outputs of the code correlators 71 and 72. The term "correlator" used in the code-correlators 71 and 72 is different from that used in the signal correlator 76. The code-correlators 71 and 72 in FIG. 7-A perform correlation between the reflected signals and the PRN code replica according to equation (1). On the other hand, the correlation defined by equation (11) is produced by averaging the product $Y_1 Y_2^*$ over the time $T_2$, as indicated by the signal correlator 75 in FIG. 7-A. In particular, the averaged product has the same form of the bistatic radar equation as that of equation (3):

$$\langle Y(\tau) = Y^*(t - \Lambda\tau)\rangle = T_1^2 \int \frac{N[\tau - R_0 + R)/c, \Delta\tau]}{4\pi R_0^2 R^2} \sigma_0 d^2\rho \quad (13)$$

where $$N[\tau, \Delta\tau] = \Lambda[\tau]\Lambda[\tau-\Delta\tau] \quad (14)$$

The annulus zone is created by the new function N which is the product of two $\Lambda$-functions (see equation (4)):

$$N[\tau,\Delta\tau]=(1-|\tau|/\tau_c)(1-|\tau-\Delta\tau|/\tau_c) \quad (15)$$

for $\tau_c-\Delta\tau \leq \tau \leq \tau_c$ and N=0 outside this interval (see FIG. 7-B). Therefore, the new annulus zone has the width $\delta=2\tau_c-\Delta\tau$.

Figure 8:
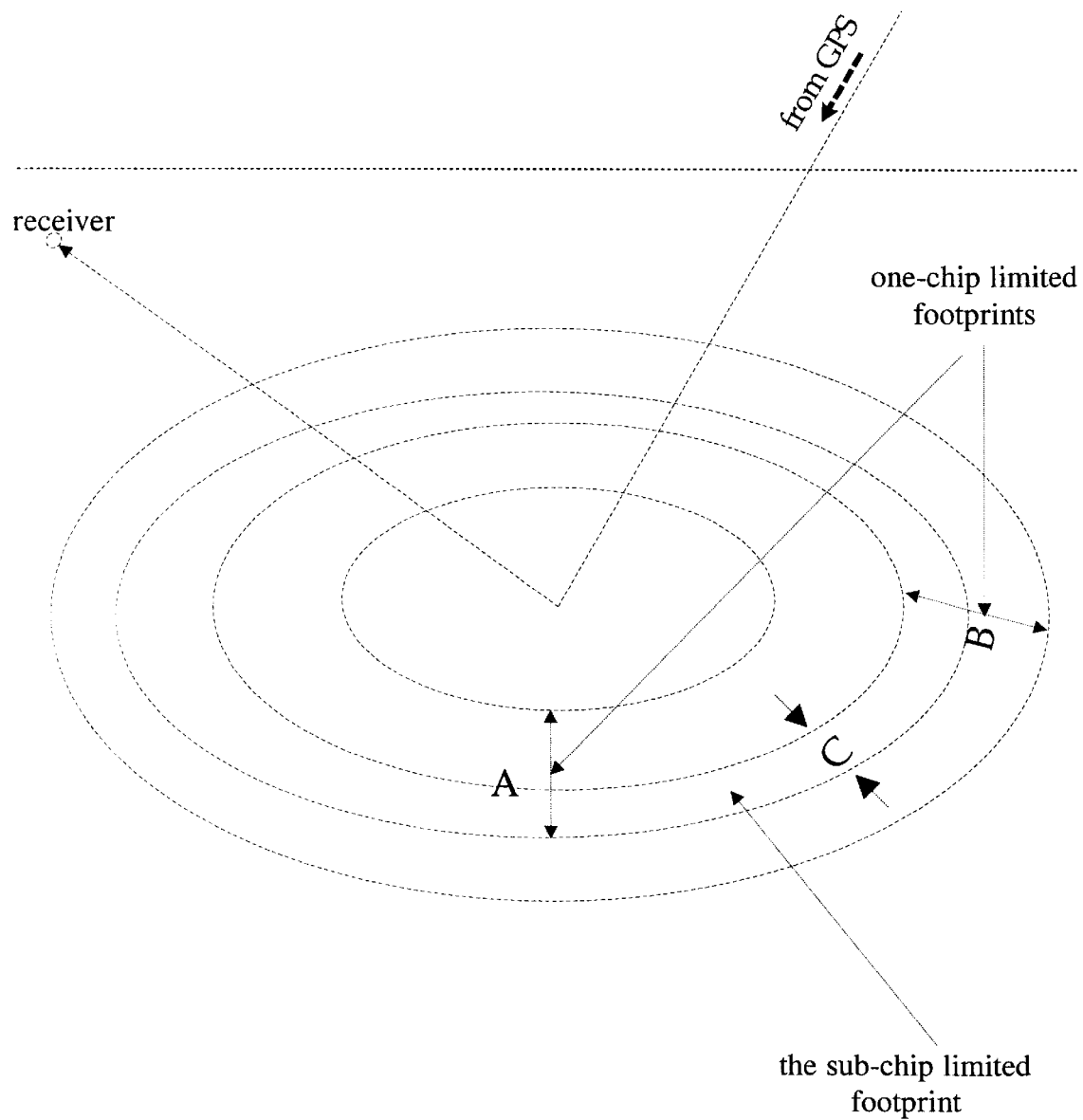
FIG. 8 is a geometrical diagram illustrating the formation of a sub-chip limited footprint.

The geometrical diagram shown FIG. 8 can be qualitatively explained by Equation (13). Assume that signal $Y_A=Y(\tau)$ originates from the area of footprint A, and signal $Y_B=Y^*(\tau-\Delta\tau)$ originates from the area of footprint B, then from the equation (13) it follows that only the common area C of footprints A and B contributes to the value $\langle Y(\tau)Y^*(\tau-\Delta\tau)\rangle$. This is confirmed by representing the signal $Y_A$ as $Y_A=Y_{A\text{-}C}+Y_C$ where the subscript A-C stand for a part of A which is not overlapping with C. Analogously, if $Y_B=Y_{B\text{-}C}+Y_C$, then the correlator $\langle Y_A Y_B \rangle$ can be expressed as follows:

$$\langle Y_A Y^*_B \rangle = \langle Y_C Y^*_C \rangle + \langle Y^*_C Y_{A\text{-}C} \rangle + \langle Y_C Y^*_{B\text{-}C} \rangle + \langle Y^*_{A\text{-}C} Y^*_{B\text{-}C} \rangle \quad (16)$$

The three last terms in equation (16) tend to zero because corresponding signals in angular brackets are caused by different scatterers and are not correlated at all. Therefore, the correlator in equation (13) is determined by the narrower sub-chip footprint C:

$$\langle Y_A Y_B^* \rangle = \langle Y_C Y_C^* \rangle \quad (17)$$

Accordingly, by increasing $\Delta\tau$ up to $\tau_c$, a narrower footprint is formed as compared to the footprint formed by the conventional approach. Of course, with a narrower footprint the received power per one sample would also decrease. This is permissible because it is used for low altitudes when the glistening zone is small. Therefore, it will take less time for one sampling sweep through the entire glistening zone, and this reduction of the signal is compensated by the increased accumulation time. The advantage of the sub-chip limited footprint is that by using it for lower altitudes, curves $\langle|Y(\tau)|^2\rangle$ showing more sensitive to the near-surface wind velocity are obtained.

The sub-chip footprint provides an optimal regime for the GPS receiver of the present invention when the receiver is operating in relatively low altitudes where the size of the glistening zone is small and a finer spatial resolution is preferred. At these altitudes, there is no problem with the Doppler shift compensation because the Doppler zone is much wider than the glistening zone. However, when the GPS receiver is operating in relatively high altitudes with greater velocities of the orbital platforms, larger glistening zones and narrower Doppler zones are typical. In particular, the footprint formed by the intersection of an annulus zone and a Doppler zone may be too small to produce enough signals. One way to increase the amount of signals received is to increase the zone where Doppler shifts are compensated simultaneously. Another way is to increase the footprint so that it is wider than the one-chip limited footprint. Accordingly, the GPS receiver of the present invention also incorporates, either separately or in combination, a method of generating a multi-chip footprint as discussed below.

FIG. 9-A shows an alternative embodiment of the present invention which, inter alia, increases the footprint by modifying the code-correlation channel in the GPS receiver. In FIG. 9-A, multi-chip sequence of the PRN codes is generated by a "multi-chip" generator 91, which is passed through a discrete delay circuit 92 with an output to one of the two inputs in a code correlator 93. The other input of the code correlator receives a composite signal from a mixer 94 which combines a reflected GPS signal received from a receiving antenna 95 and a wide-band signal generated from a wide-band oscillator 96. The code correlator 93 correlates the delayed multi-chip sequence of the PRN codes with the composite signal. The output of the code correlator is detected by an average power generator 97 for averaging power over time $T_2 \gg \tau_c$. The average power signal from the average power generator 97 is further processed by a signal processor (not shown) to derive data on wind conditions such as wind velocity vectors.

The wide-band oscillator 96 contains a voltage controlled oscillator 98 which produces a signal with the spectral contour wide enough to embrace one Doppler zone over frequencies, and with the central frequency which is tuned to compensate the bulk Doppler shift. This signal then passes through a series of m−1 frequency shifting elements 99 each producing $\Delta f_D$-frequency shift. The frequency shifting elements 99 can be implemented, e.g., by m independent oscillators producing the signal with a needed frequency shift and width. Accordingly, a GPS scattered signal from the receiving antenna 95 is mixed with the wide-band signal in order to provide the code correlator 93 with a resulting signal that contains contribution from the m Doppler zones. The number m may vary, but the maximal number required is of order of ratio of the glistening zone width to the Doppler zone width. With this number of frequency channels, all Doppler frequency shifts over the entire glistening zone are compensated simultaneously, with the annulus zone becoming a footprint.

Referring to the "multi-chip" generator 91 shown in FIG. 9-A, it includes a conventional PRN-code replica generator 100 and plurality of n−1 time-delay circuits 102. In particular, N output of the PRN-code replica generator 100 is connected to the set of n−1 time-delay circuits 102 each of which introduces a time shift equaled to the chip length, $\tau_c$. Therefore, on the input of the correlator, the multi-chip sequence shown below are sent:

$$b(t) = \sum_{j=0}^{n-1} a(t - j\tau_c) \quad (18)$$

where a(t) is the replica generated by the conventional PRN code generator 92. Now, analogously to the procedure described by equation (1), the sequence b can be correlated with the PRN code a. The result is a new function shown on FIG. 9-B:

$$M(\tau) = \frac{1}{T_1} \int_0^{T_1} b(t - \tau)a(t)dt \quad (19)$$

$$= \frac{1}{T_1} \sum_{j=0}^{n-1} \int_0^{T_1} a(t - \tau - j\tau_c)a(t)dt$$

$$= \frac{1}{T_1} \sum_{j=0}^{n-1} \int_0^{T_1} \Lambda(\tau - j\tau_c)$$

Figure 10:
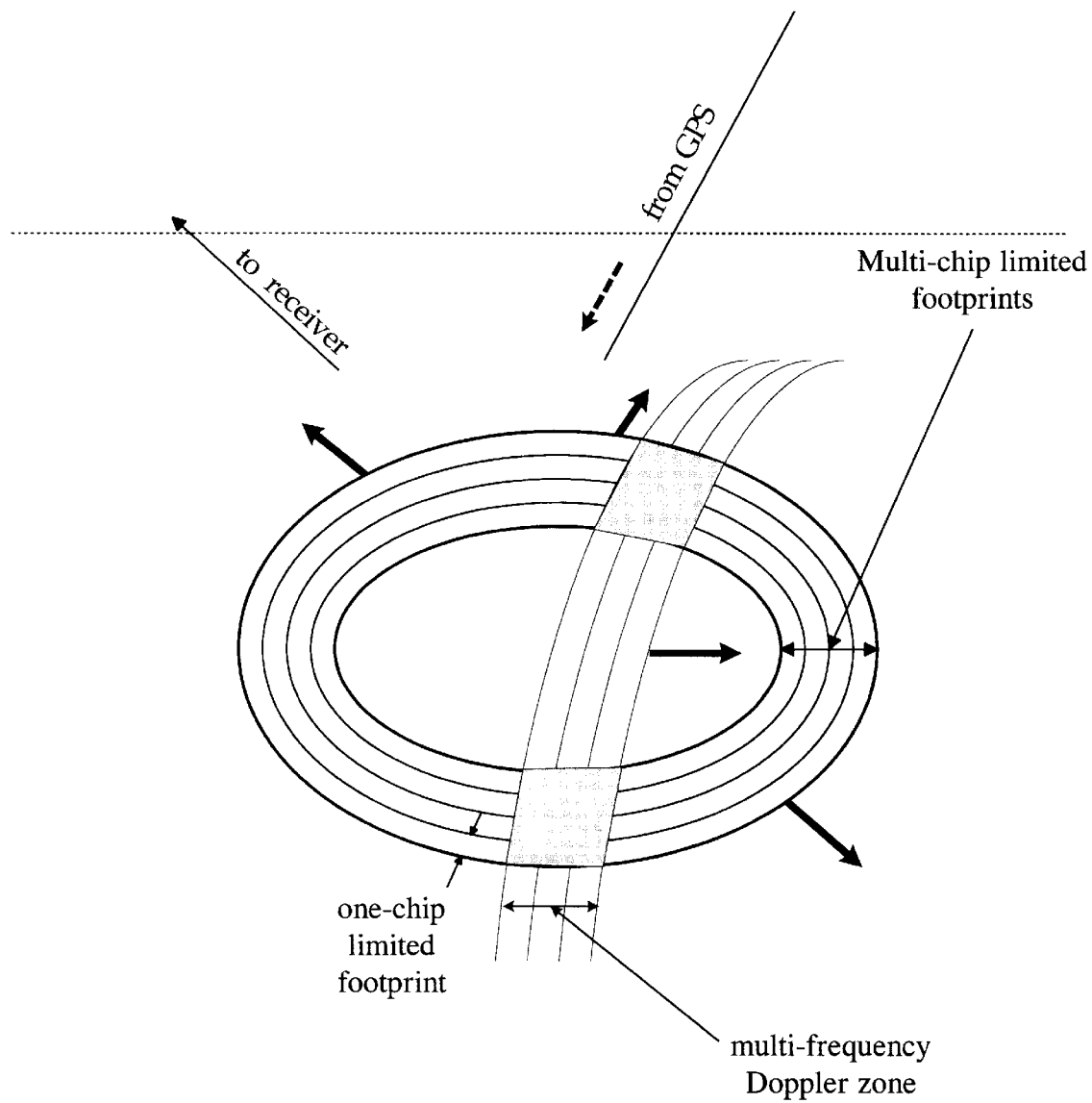
FIG. 10 is a geometrical diagram illustrating the formation of a multi-chip limited footprint.

This function creates a wider footprint qualitatively depicted in FIG. 10. The width of the M-function is $\delta=(n+1)\tau_c$, whereas the width of the $\Lambda$-function is $2\tau_c$. Despite the fact that function b lasts about $\delta=(n+1)\tau_c$, the integration time $T_1$ is the same as in the case of one-chip scheme. This gives about the n-times gain compared to the standard approach based on the accumulation contributions from different shifted one-chip limited footprints. Therefore, by using the function $M(\tau)$, a wider footprint is obtained where the equation for the average power versus a delay is:

$$\langle |Y(\tau)|^2 \rangle = \frac{1}{T_2} \int_0^{T_2} |Y(\tau, t_0)|^2 dt_0 \quad (20)$$

$$= T_1^2 \int \frac{M^2[\tau - (R_0 + R)/c]}{4\pi R_0^2 R^2} \sigma_0 d^2\rho$$

By varying the number n, the width of new footprint is also changed. Now the sampling rate (delay steps) over $\tau$ is also changed respectively. In the standard approach (see, e.g., reference [3]), the average power measured every half-chip, or $\tau_c/2$ over the time delay, with the total number of bins 32 in one cycle of a sampling. In order to keep the same number of bins, the new delay step is equal to $(n+1)\tau_c/4$. As in the previous method the width of the multi-chip-limited footprint is chosen optimally, in order to cover the entire span of the glistening zone using the fixed number of samples.

Figure 6A:
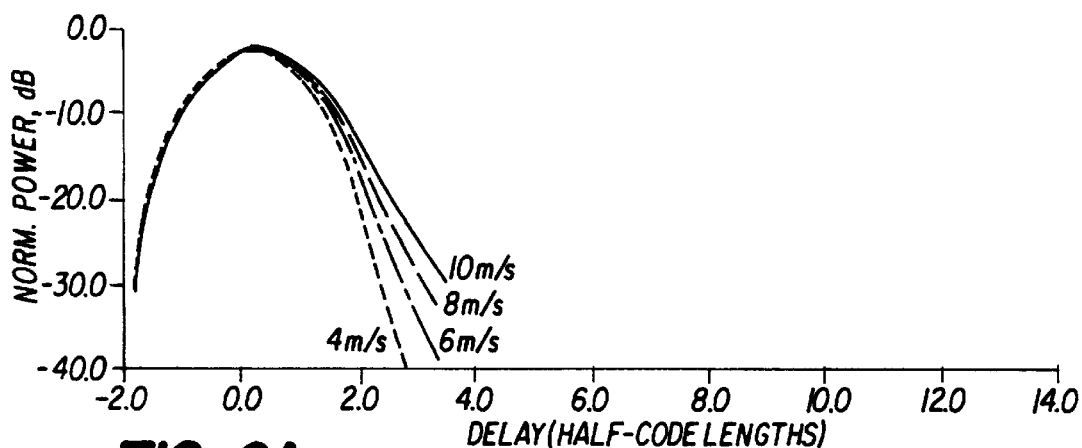
FIGS. 6-A through 6-C are charts showing the normalized power relative to the delay for the receiver height of 1, 10, and 300 kilometers, respectively.
Figure 6B:
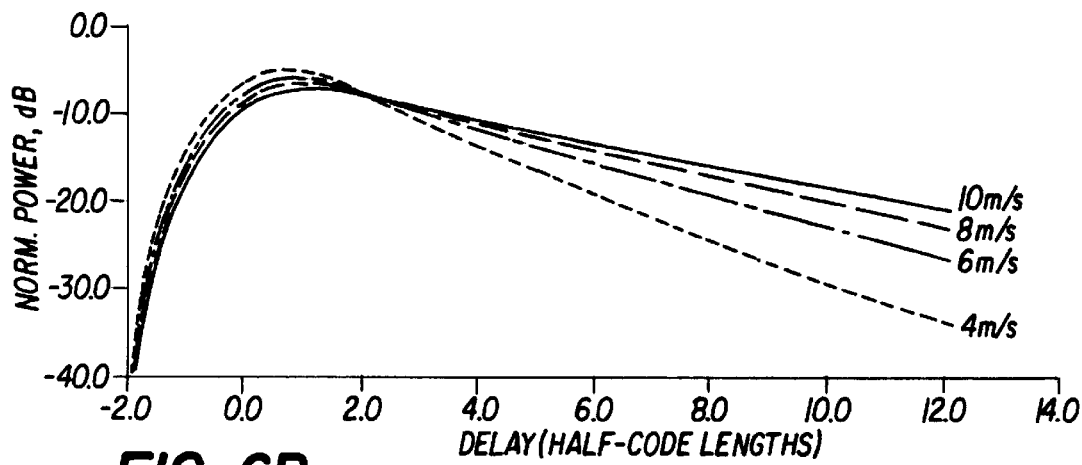
Figure 6C:
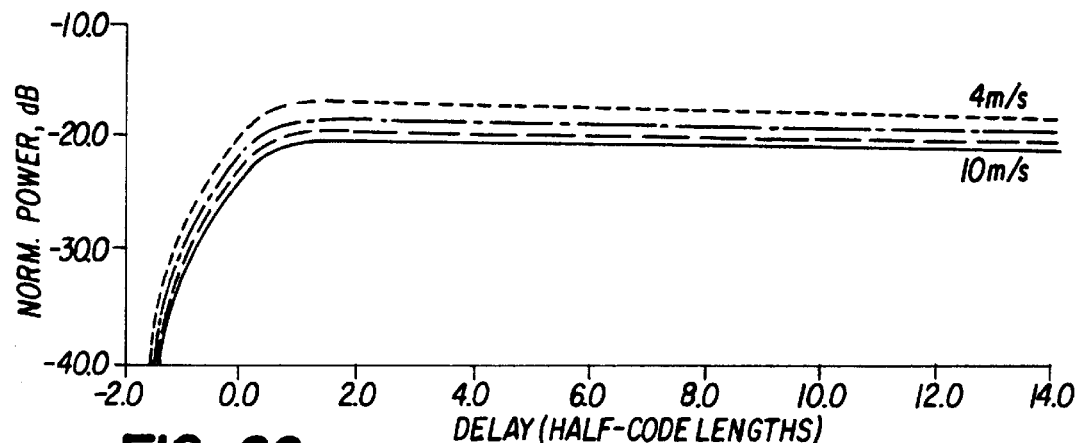
Figure 11A:
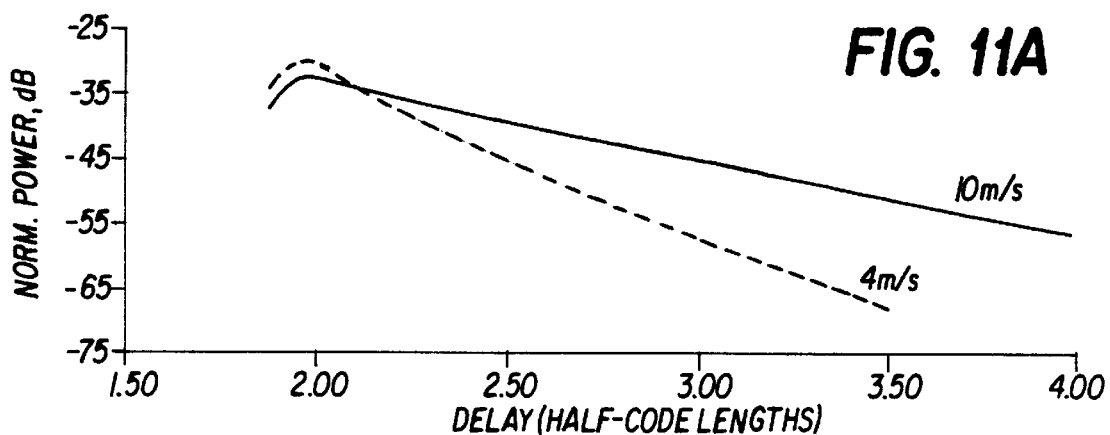
FIGS. 11-A through 11-C are charts showing the normalized power relative to the delay for the sub-chip footprint in 1, 10, and 300 kilometer altitudes, respectively.
Figure 11B:
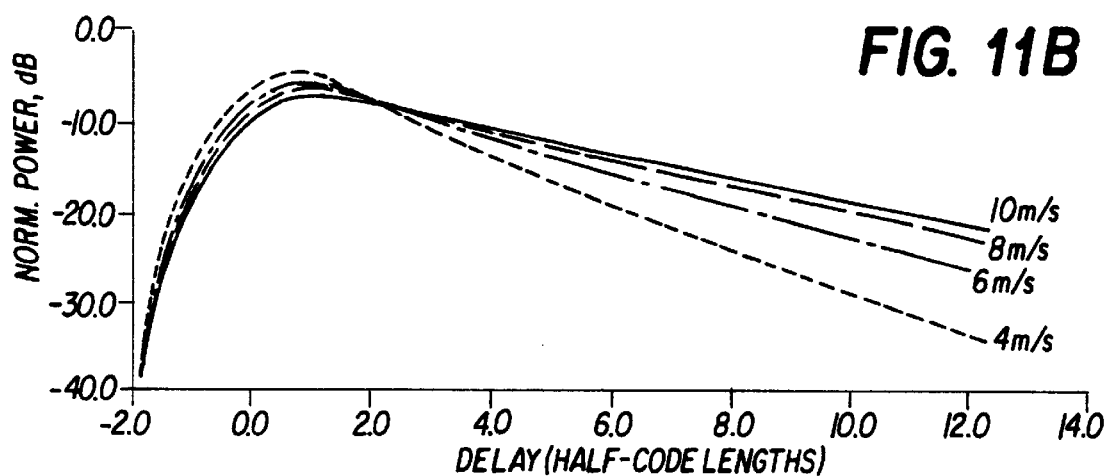
Figure 11C:
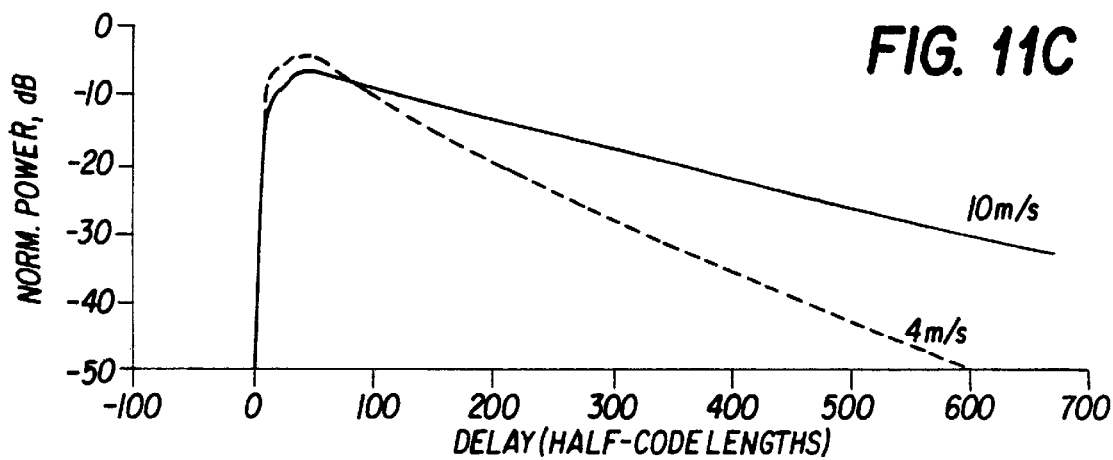

FIGS. 11-A through 11-C show the results of calculations regarding the effect of the sub-chip footprint and the multi-chip footprint as compared to the standard one-chip footprint approach shown in FIGS. 6-A through 6-C. FIG. 11-A shows the dependence of the normalized averaged power over the delay for the same low altitude 1 km and wind conditions as in FIG. 6-A. The width of the new annulus N-function is chosen as $\delta=\tau_c/10$. The curves shown in FIG. 11-A have the same type of behavior as those shown in FIGS. 6-B and 11-B, i.e., for the case of optimal altitude 10 km. However, the trailing-edge slopes of curves shown in FIG. 11-A show a better sensitivity to the wind velocity than those shown in FIG. 6-A, notwithstanding the low altitude.

The advantage of utilizing the GPS receiver having the multi-chip limited footprint is that by using it for high altitudes, a stronger signal $\langle |Y(\tau)|^2 \rangle$ can obtained and the trailing-edge slopes of the curves indicated that the GPS receiver is more sensitive to the near-surface wind velocity. FIG. 11-C shows the dependence of the normalized averaged power over the delay for the same altitude 300 km and wind conditions as in FIG. 6-C. The width of the new annulus M-function was chosen $\delta=22\tau_c$. The level of the signal and curve behavior become similar to those of curves in FIGS. 6-B and 11-B, i.e., for the case of optimal altitude 10 km. Therefore, despite the higher altitudes trailing-edge, slopes of curves shown in FIG. 11-C demonstrate better sensitivity to the wind velocity than the curves shown in FIG. 6-C.

The method of the generation of a multi-chip limited footprint provides an unique advantage comparatively to the one-chip limited footprint. For the method based on the conventional one-chip scheme with the total number m*n of sampling bins, the post-processing of the averaged power $\langle |Y(\tau)|^2 \rangle$, which consists of summing every n samples for every m-th bin, gives the same level of the signal as the n-chip footprint scheme but takes the n-time longer time interval for processing. Therefore, potentially the multi-chip footprint method gives 10 log n more dB than the conventional one-chip method. Moreover, it is inconvenient to have the number of samples changed every time, it is more convenient to have a standardized output from a GPS receiver which assumes a fixed number m of sampling bins, and a standardized post-processing of the averaged power.

If the entire glistening zone fits within one Doppler zone, then the conventional scheme can compensate the corresponding Doppler shift. Otherwise, only partial compensation for one specific Doppler zone can be accomplished due to the non-uniform Doppler shift and multiplicity of Doppler zones. Therefore, the resulting footprint would be an intersection of the one-or multi-chip limited annulus with the one Doppler zone, and a significant reduction of the signal would result. However, the wide-band oscillator of the present invention, with a large m number, allows the Doppler shift to be compensated for the entire glistening zone or footprint. This is especially useful for the satellite GPS receiver because it provides enough signal to make time-delayed annuli a reliable tool for scanning the glistening zone for purposes of wind retrieval.

Doppler hyperbolic zones and chip-limited annuli are regarded as complimentary elements and therefore, they can be switched. The system has a large number of elements, n in the "multi-chip" generator such that any glistening zone is entirely covered by it. Than, using the tunable frequency parameter 8 with the sufficient number of m elements, the wind retrieval task is accomplished by scanning the one- or multi-Doppler zone through the glistening zone. At some conditions, this scheme is more convenient and advantageous than the one considered above.

As discussed earlier, calculations show that the one-chip footprint created by the conventional GPS receiver of the scattered signal does not provide an optimal regime for wind retrieval for the arbitrary altitude of the receiver. Therefore, in order to optimize the performance of the GPS scatterometer, an adaptable spatial resolution is incorporated in the present invention to allow wind measurements in any range of altitudes. In particular, by modifying the code correlation process in the GPS receiver to create a new footprint having a size that is either smaller or larger than that the footprint disclosed in the prior art, the present invention allows for the use of a low-gain, wide-beam antenna, and, at the same time, a desirable width of a synthesized surface footprint. Having the sub-chip-limited footprint (narrower then the standard one-chip-limited one) also allows for an increase in the spatial resolution for an airborne GPS scatterometer systems working at low altitudes and a better sensitivity to the wind velocity. Additionally, the wider, multi-chip-limited footprint allows for an increase in the signal-to-noise ratio and better sensitivity to wind velocity for high-altitude, space-borne systems.

While particular embodiments of the present invention have been shown and described, it will be apparent to those skilled in the art that various changes and modifications may be made therein without departing from the spirit or scope of the invention. Accordingly, it is intended that the appended claims cover such changes and modifications that come within the spirit and scope of the invention.

What is claimed is:

1. An apparatus for sensing and processing global positioning system (GPS) signals reflected from an ocean surface, said apparatus comprising:
   a receiving means for receiving said GPS signals;
   a generator means for generating pseudo-random noise codes;
   a pair of parallel delay means for delaying said pseudo-random noise codes;
   a pair of parallel code correlator means for generating correlated signals by correlating said GPS signals with said delayed pseudo-random noise codes; and
   a signal correlator means for correlating said correlated signals from said code correlator means to generate a power signal averaged over a time period;
   wherein said delay means and said code correlator means are variable for decreasing a footprint of the ocean surface region from which said GPS signals are received.

2. The apparatus of claim 1, wherein said pair of parallel delay means has different delay periods.

3. A method for sensing and processing global positioning system (GPS) signals reflected from an ocean surface region, said method comprising the steps of:
   receiving said GPS signals;
   generating pseudo-random noise codes;
   delaying said pseudo-random noise codes in parallel;
   forming correlated signals by correlating said GPS signals in parallel with said delayed pseudo-random noise codes; and
   outputting a power signal averaged over a time period by correlating said correlated signals from said code correlator means;
   wherein said delaying of said pseudo-random noise codes and forming of correlated signals are variable for decreasing a footprint of the ocean surface region from which said GPS signals are received.

4. The method of claim 3, wherein the delaying step is achieved in different time periods.

5. An apparatus for sensing and processing global positioning system (GPS) signals reflected from an ocean surface region, said apparatus comprising:
   a receiving means for receiving said GPS signals;
   a generator means for generating a pseudo-random noise code;
   a first delay means for delaying said pseudo-random noise code by a first time period;
   a second delay means for delaying said pseudo-random noise code by a second time period;
   a first code correlator means for generating a first correlated signal by correlating said GPS signals with said pseudo-random noise code delayed by said first delay means;
   a second code correlator means for generating a second correlated signal by correlating said pseudo-random noise code delayed by said second delay means; and
   a signal correlator means for receiving said first and second correlated signals from said first and second code correlator means, wherein said first two correlated signals are averaged over a third time period by said signal correlator means;
   wherein said first and second delay means and said first and second code correlator means are variable for decreasing a footprint of the ocean surface region from which said GPS signals are received.

6. The apparatus of claim 5, wherein said first time period is different from said second time period.

7. A method for sensing and processing global positioning system (GPS) signals reflected from an ocean surface region, said method comprising the steps of:
   receiving said GPS signals;
   generating a pseudo-random noise code;
   delaying said pseudo-random noise code by a second time period which is different from said first time period;
   generating a first correlated signal by correlating said GPS signals with said pseudo-random noise code delayed by said first delay means;
   generating a second correlated signal by correlating said pseudo-random noise code delayed by said second delay means; and receiving said first and second correlated signals from said first and second code correlator means, wherein said first two correlated signals are averaged over a third time period by said signal correlator means;

wherein said delaying of said-random noise code by the first and second time periods and the generating of the first and second correlated signals are variable for decreasing a footprint of the ocean surface region from which said GPS signals are received.

8. The method of claim 7, wherein said first time period is different from said second time period.

9. An apparatus for sensing and processing a global position system signal reflected from a terrestrial sphere, said apparatus comprising:

a receiving means for receiving said GPS signal;

an oscillator means for generating an oscillating signal of a wide bandwidth;

a mixer means for multiplying said oscillating signal with said GPS signal;

a generator means for generating a time-shifted pseudo-random noise code;

a delay means for delaying said time-shifted pseudo-random noise code by a predetermined time period;

a code correlator means for generating a correlated signal by correlating said integrated signal with said time-shifted pseudo-random noise code by said delay means; and a power averaging means for averaging said correlated signal from said code correlator means over a predetermined time period;

wherein said generator means comprises a multi-chip generator, and said delay means and said code correlator means are variable for increasing a footprint of an area from which said apparatus receives said GPS signal.

10. The apparatus of claim 9, wherein said generating means includes a generating means for generating a pseudo-random noise code and a plurality of delay means for delaying said pseudo-ransom noise code by a chip length.

11. The apparatus of claim 9, wherein said oscillating means includes an oscillating means for generating a voltage controlled oscillating signal and a plurality of shifting means for shifting said voltage controlled oscillating signal according to a predetermined frequency.

12. A method for sensing and processing a global positioning signal reflected from a terrestrial sphere, said method comprising the steps of:

receiving said GPS signal;

forming an oscillating signal of a wide bandwidth;

multiplying said oscillating signal with said GPS signal to form an integrated signal;

generating a time-shifted pseudo-random noise code by a multi-chip generator;

delaying said time-shifted pseudo-random noise code by a predetermined time period;

correlating said integrated signal with said time-shifted pseudo-random noise code delayed by said delay means to yield a correlated signal; and averaging said correlated signal from said code correlator means over a predetermined time period;

wherein the predetermined time period of said delaying step and the correlating step of said time-shifted pseudo-random noise code are variable to increase a footprint of an area from which said receiving step receives said GPS signal.

13. The method of claim 12, wherein said generating step includes the steps of generating a pseudo-random noise code and delaying said pseudo-ransom noise code by a chip length.

14. The method of claim 12, wherein said forming step includes the steps of generating a voltage controlled oscillating signal and shifting said voltage controlled oscillating signal according to a predetermined frequency.

* * * * *